No. 843,234. PATENTED FEB. 5, 1907.
C. RAWLINSON.
TRUCK.
APPLICATION FILED FEB. 15, 1906.
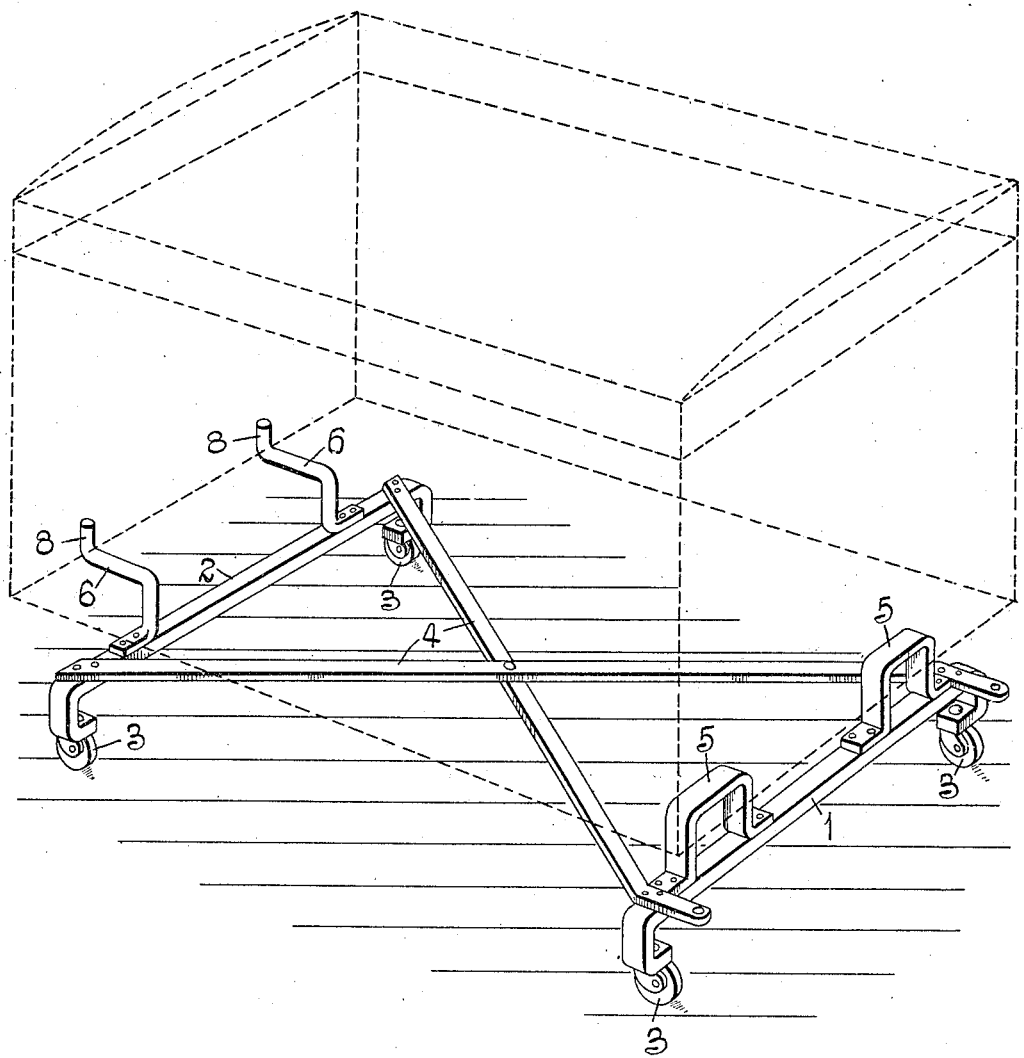
Witnesses
A. J. McCauley.
Edgar T. Farmer
Inventor:
Charles Rawlinson
by Bakewell Cornwall
Att'y's.

UNITED STATES PATENT OFFICE.

CHARLES RAWLINSON, OF ST. LOUIS, MISSOURI.

TRUCK.

No. 843,234.  Specification of Letters Patent.  Patented Feb. 5, 1907.

Application filed February 15, 1906. Serial No. 301,255.

*To all whom it may concern:*

Be it known that I, CHARLES RAWLINSON, a citizen of the United States, residing at St. Louis, Missouri, have invented a certain new and useful Improvement in Trucks, of which the following is a full, clear, and exact description, such as will enable others skilled in the art to which it appertains to make and use the same, reference being had to the accompanying drawing, forming part of this specification, in which the figure is a perspective view of my improved trunk-truck.

This invention relates to a new and useful improvement in trucks designed particularly for use in supporting trunks, whereby the trunks can be conveniently removed from place to place and also strapped or tied with a rope without necessitating the lifting of the trunk from the truck.

In the drawing, 1 and 2 indicate the axles, which are preferably bent down at each end and thence extended inwardly, so as to provide a mount for the caster-rollers 3. It is obvious that the supporting wheels or rollers can be mounted in a different manner upon the axles; but I prefer the form shown, because the rollers are set in with respect to the truck-frame and are therefore out of the way.

The axles are connected together by reach-bars 4, which are preferably crossed in the form of an X to give greater strength and rigidity to the truck, said bars at the forward ends being extended beyond the axles and provided with openings constituting eyes in which a rope or handle may be arranged for the purpose of moving the truck. On the axle 1 are elevated supports 5 in the form of inverted U-shaped bars. On the axle 2 are supports 6, having bent-up projections at their extremities 8, forming stops for the trunk.

In operation, assuming that the trunk is set up on end, the truck is tilted, so as to locate the bent ends 8 of the support under the trunk, after which the trunk is tilted over and placed in proper position on the truck, being supported at its four corners by the supports 5 and 6. The truck and trunk may now be transported from place to place. Where the device is used in hotels and other places where trunks are frequently handled, the truck is designed to be left under the trunk, which enables the trunk to be moved with ease when it is desired to sweep the floor under the trunk. If it is desired to strap the trunk, it is obvious that the elevated supports permit the passage of the strap or rope around the trunk both in a transverse direction and in a longitudinal direction.

To remove the trunk from the truck, it is only necessary to tilt the truck until the projections 8 rest on the floor, when the trunk can be eased off the truck and set up on end, the trunk being separately withdrawn.

I am aware that minor changes in the construction, arrangement, and combination of the several parts of my device can be made and substituted for those herein shown and described without in the least departing from the nature and principle of my invention.

Having thus described the invention, what is claimed as new, and desired to be secured by Letters Patent, is—

1. In a truck of the character described, the combination with axles and their supporting-rollers, of reach-bars connecting the axles, said reach-bars extending beyond the axles and provided with openings constituting eyes, and elevated supports carried by the axles, one set of supports extending outwardly from the axle on which they are mounted; substantially as described.

2. In a truck of the character described, the combination with roller-carrying axles, means for connecting said axles, and upwardly-projecting supports on each axle, one set of supports extending outwardly beyond the plane of the axle to which they are connected and terminating in upwardly-extending projections; substantially as described.

3. In a truck of the character described, the combination with axles which are bent downwardly and inwardly at their ends, rollers mounted on inwardly-extending extremities of said axles, crossed reach-bars connecting said axles, elevated supports carried by the axles, said supports being spaced apart so that ropes or straps may be passed around the trunk or other article on the truck both in a transverse and in a horizontal direction without lifting the trunk or other article from the truck; substantially as described.

In testimony whereof I hereunto affix my signature, in the presence of two witnesses, this 10th day of February, 1906.

CHARLES RAWLINSON.

Witnesses:
LENORE WILSON,
GEORGE BAKEWELL.